(12) United States Patent
Moles et al.

(10) Patent No.: US 12,368,995 B2
(45) Date of Patent: Jul. 22, 2025

(54) SYSTEM AND METHOD FOR AUTOMATICALLY TUNING DIGITAL SIGNAL PROCESSING CONFIGURATIONS FOR AN AUDIO SYSTEM

(71) Applicant: Shure Acquisition Holdings, Inc., Niles, IL (US)

(72) Inventors: Steven Christopher Moles, Lincolnshire, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/628,402

(22) Filed: Apr. 5, 2024

(65) Prior Publication Data

US 2024/0314497 A1    Sep. 19, 2024

Related U.S. Application Data

(63) Continuation of application No. 17/662,902, filed on May 11, 2022, now Pat. No. 11,985,488.
(Continued)

(51) Int. Cl.
*H04R 3/12* (2006.01)
*H04R 3/00* (2006.01)
(Continued)

(52) U.S. Cl.
CPC ............ *H04R 3/12* (2013.01); *H04R 3/005* (2013.01); *H04R 5/02* (2013.01); *H04R 5/027* (2013.01);
(Continued)

(58) Field of Classification Search
CPC . H04R 3/12; H04R 3/005; H04R 5/02; H04R 5/027; H04R 29/002; H04R 29/005;
(Continued)

(56) References Cited

U.S. PATENT DOCUMENTS

| 4,610,024 A | 9/1986 | Schulhof |
| 5,386,478 A | 1/1995 | Plunkett |

(Continued)

FOREIGN PATENT DOCUMENTS

| CN | 202077158 | 12/2011 |
| CN | 102348148 | 2/2012 |

(Continued)

OTHER PUBLICATIONS

Moles, "Athena Auto-Tuning DSP," Demo Proposal, Shure, 2020, 38 pp.
(Continued)

*Primary Examiner* — Andrew Sniezek
(74) *Attorney, Agent, or Firm* — Neal, Gerber & Eisenberg LLP

(57) ABSTRACT

Embodiments include a processing device communicatively coupled to a plurality of audio devices comprising at least one microphone and at least one speaker, and to a digital signal processing (DSP) component having a plurality of audio input channels for receiving audio signals captured by the at least one microphone, the processing device being configured to identify one or more of the audio devices based on a unique identifier associated with each of the one or more audio devices; obtain device information from each identified audio device; and adjust one or more settings of the DSP component based on the device information. A computer-implemented method of automatically configuring an audio conferencing system, comprising a digital signal processing (DSP) component and a plurality of audio devices including at least one speaker and at least one microphone, is also provided.

18 Claims, 4 Drawing Sheets

Related U.S. Application Data

(60) Provisional application No. 63/202,063, filed on May 26, 2021.

(51) Int. Cl.
  *H04R 5/02* (2006.01)
  *H04R 5/027* (2006.01)
  *H04R 29/00* (2006.01)
  *H04S 3/00* (2006.01)

(52) U.S. Cl.
  CPC ......... *H04R 29/002* (2013.01); *H04R 29/005* (2013.01); *H04S 3/008* (2013.01); *H04R 2430/01* (2013.01); *H04S 2400/01* (2013.01); *H04S 2400/13* (2013.01); *H04S 2400/15* (2013.01)

(58) Field of Classification Search
  CPC . H04R 2430/01; H04S 3/008; H04S 2400/01; H04S 2400/13; H04S 2400/15
  See application file for complete search history.

(56) References Cited

U.S. PATENT DOCUMENTS

| | | | |
|---|---|---|---|
| 6,696,633 B2 | 2/2004 | Miyagishima | |
| 6,760,451 B1 * | 7/2004 | Craven | H03G 5/005 381/59 |
| 7,489,784 B2 | 2/2009 | Yoshino | |
| 8,081,776 B2 | 12/2011 | Haulick | |
| 8,082,051 B2 | 12/2011 | Mihelich | |
| 8,401,489 B2 | 3/2013 | Schmidt | |
| 8,503,685 B2 | 8/2013 | Kulkarni | |
| 9,293,151 B2 | 3/2016 | Herbig | |
| 9,330,654 B2 | 5/2016 | Nicholson | |
| 9,560,460 B2 | 1/2017 | Chaikin | |
| 9,641,947 B2 | 5/2017 | Loether | |
| 9,748,913 B2 | 8/2017 | Kim | |
| 10,129,674 B2 | 11/2018 | Sheen | |
| 10,499,152 B2 | 12/2019 | Rabinowitz | |
| 10,530,917 B2 | 1/2020 | Every | |
| 10,721,580 B1 | 7/2020 | Hoffmann | |
| 10,734,965 B1 | 8/2020 | McPherson | |
| 10,750,304 B2 | 8/2020 | McPherson | |
| 10,764,699 B1 | 9/2020 | Rule | |
| 2002/0196951 A1 | 12/2002 | Tsai | |
| 2009/0197534 A1 | 8/2009 | Stenberg | |
| 2013/0163748 A1 | 6/2013 | Khanduri | |
| 2014/0064513 A1 | 3/2014 | Behringer | |
| 2019/0385629 A1 | 12/2019 | Moravy | |
| 2020/0077219 A1 | 3/2020 | Sheen | |
| 2021/0266667 A1 * | 8/2021 | Zabel | H04B 17/318 |

FOREIGN PATENT DOCUMENTS

| | | |
|---|---|---|
| CN | 108462921 | 8/2018 |
| JP | 10136498 | 4/1998 |
| JP | 2016116001 | 6/2016 |
| WO | 2000059110 | 10/2000 |
| WO | 2017201868 | 11/2017 |
| WO | 2018206093 | 11/2018 |

OTHER PUBLICATIONS

Tashev, "Gain Self-Calibration Procedure for Microphone Arrays," Proceedings of International Conference for Multimedia and Expo ICME 2004, 4 pp.

* cited by examiner

SYSTEM AND METHOD FOR AUTOMATICALLY TUNING DIGITAL SIGNAL PROCESSING CONFIGURATIONS FOR AN AUDIO SYSTEM

CROSS-REFERENCE

This application is a continuation of U.S. patent application Ser. No. 17/662,902, filed on May 11, 2022, which claims priority to U.S. Provisional Patent Application No. 63/202,063, filed on May 26, 2021. The entirety of both applications are incorporated by reference herein.

TECHNICAL FIELD

This disclosure generally relates to an audio system located in a conferencing environment, such as a conference room. More specifically, this disclosure relates to automatically tuning, optimizing, or otherwise controlling configurations for a digital signal processing component of the audio system.

BACKGROUND

Conferencing environments, such as conference rooms, boardrooms, video conferencing settings, and the like, typically involve the use of microphones for capturing sound from various audio sources active in such environments. Such audio sources may include human participants of a conference call, for example, that are producing speech, music and other sounds. The captured sound may be disseminated to a local audience in the environment through amplified speakers (for sound reinforcement), and/or to others remote from the environment (such as, e.g., a via a telecast and/or webcast) using communication hardware. The conferencing environment may also include one or more loudspeakers or audio reproduction devices for playing out loud audio signals received, via the communication hardware, from the remote participants, or human speakers that are not located in the same room. These and other components of a given conferencing environment may be included in one or more conferencing devices and/or operate as part of an audio system.

The distributed audio signals produced in such environments are typically aggregated to a single audio signal processing device, computer, or server. In such cases, a digital signal processor (DSP) may be included in the conferencing environment to process the audio signals using, for example, automatic mixing, matrix mixing, delay, compressor, and parametric equalizer (PEQ) functionalities. Further explanation and exemplary embodiments of the functionalities of existing DSP hardware may be found in the manual for the P300 IntelliMix Audio Conferencing Processor from SHURE, which is incorporated by reference in its entirety herein. The P300 manual includes algorithms optimized for audio/video conferencing applications and for providing a high quality audio experience, including eight channels of acoustic echo cancellation, noise reduction and automatic gain control.

In general, conferencing devices are available in a variety of sizes, form factors, mounting options, and wiring options to suit the needs of particular environments. The types of conferencing devices, their operational characteristics (e.g., lobe direction, gain, etc.), and their placement in a particular conferencing environment may depend on a number of factors, including, for example, the locations of the audio sources, physical space requirements, aesthetics, room layout, and/or other considerations. For example, in some environments, a conferencing device may be placed on a table or lectern to be near the audio sources. In other environments, a conferencing device may be mounted overhead or on a wall to capture the sound from, or project sound towards, the entire room, for example.

Typically, a system designer or other professional installer considers the factors listed above when selecting which conferencing devices and other equipment to include in a particular environment. In addition, the installer manually connects, tests, and configures each piece of equipment to ensure optimal performance of the overall audio system. For example, the installer may position or point microphone lobes towards locations where talkers are expected to be in a room (e.g., the seats around a conference tables), adjust a beam width of each lobe depending on how many talkers are expected to be in the corresponding area (e.g., narrow for single talkers, or medium or wide to cover multiple talkers by a single lobe), test each lobe for sufficient clarity and presence and a smooth sound level across the entire lobe (e.g., by sitting in the area and talking while listening to the mixed output via headphones), and confirm that only the expected lobe gates on when talkers are seated in correct positions. The installer may also check signal levels and audio continuity by verifying that near-end audio signals captured by the microphones are reaching an output port (e.g., USB port) for transmission to remote participants, and that far-end audio signals are reaching the speaker outputs. After the initial configurations are complete, the installer may return to regularly update the audio system to adapt to changes in room layout, seated locations, audio connections, and other factors, as these changing circumstances may cause the audio system to become sub-optimal over time.

Accordingly, there is still a need for an audio system that can be optimally configured and maintained with minimal setup time, cost, and manual effort.

SUMMARY

The invention is intended to solve the above-noted and other problems by providing systems and methods that are designed to, among other things: (1) automatically identify one or more devices included in an audio system and determine one or more characteristics of an environment or room in which the audio system is located, and (2) automatically tune one or more digital signal processing configurations of the audio system based on said room characteristics and device information obtained from each device.

Embodiments include an audio system comprising a speaker configured to play an audio test signal; at least one microphone configured to capture an audio response signal representative of said audio test signal; a computing device comprising a digital signal processing (DSP) component having a plurality of audio input channels for receiving audio signals captured by the at least one microphone; and a processor communicatively coupled to the speaker, the at least one microphone, and the computing device, and configured to: send the audio test signal to the speaker; receive the audio response signal from each microphone; and adjust one or more settings of the DSP component based on the audio response signal.

Another exemplary embodiment includes a computer-implemented method of automatically tuning an audio conferencing system comprising a speaker, at least one microphone, and a digital signal processing (DSP) component, the method comprising: sending, using a processor, an audio test signal to the speaker; receiving, at the processor, an audio response signal representative of the audio test signal from the at least one microphone; and adjusting, using the processor, one or more settings of the DSP component based on the audio response signal, wherein the DSP component comprises a plurality of audio input channels for receiving audio signals captured by the at least one microphone.

Yet another exemplary embodiment includes a computer-implemented method of automatically configuring an audio conferencing system comprising a digital signal processing (DSP) component and a plurality of audio devices including at least one speaker and at least one microphone, the method comprising: identifying, using a processor, one or more of the audio devices based on a unique identifier associated with each of said one or more audio devices; obtaining, via the processor, device information from each identified audio device; and adjusting, using the processor, one or more settings of the DSP component based on the device information, wherein the DSP component comprises a plurality of audio input channels for receiving audio signals captured by the at least one microphone.

Another exemplary embodiment includes an audio system, comprising: a plurality of audio devices comprising at least one speaker and at least one microphone; a computing device comprising a digital signal processing (DSP) component having a plurality of audio input channels for receiving audio signals captured by the at least one microphone; and a processor communicatively coupled to the plurality of audio devices and the computing device, and configured to: identify one or more of the audio devices based on a unique identifier associated with each of said one or more audio devices; obtain device information from each identified audio device; and adjust one or more settings of the DSP component based on the device information.

Another embodiment includes a digital signal processor comprising a plurality of audio input channels for receiving audio input signals captured by at least one microphone included in a plurality of audio devices; one or more audio output channels for providing audio output signals to at least one speaker included in the plurality of audio devices; and a plurality of audio processing components configured to process the audio input signals and generate the audio output signals based thereon, the audio processing components being in communication with a controller for adjusting one or more settings of the audio processing components based on device information obtained for each of the audio devices using a unique identifier associated with the audio device.

Still another embodiment includes a processing device communicatively coupled to a plurality of audio devices comprising at least one microphone and at least one speaker, and to a digital signal processing (DSP) component having a plurality of audio input channels for receiving audio signals captured by the at least one microphone, the processing device being configured to identify one or more of the audio devices based on a unique identifier associated with each of said one or more audio devices; obtain device information from each identified audio device; and adjust one or more settings of the DSP component based on the device information.

Yet another embodiment includes a processing device communicatively coupled to a plurality of audio devices comprising at least one microphone and at least one speaker, and to a digital signal processing (DSP) component having a plurality of audio input channels for receiving audio signals captured by the at least one microphone, the processing device being configured to send the audio test signal to the at least one speaker; receive the audio response signal from each microphone; and adjust one or more settings of the DSP component based on the audio response signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
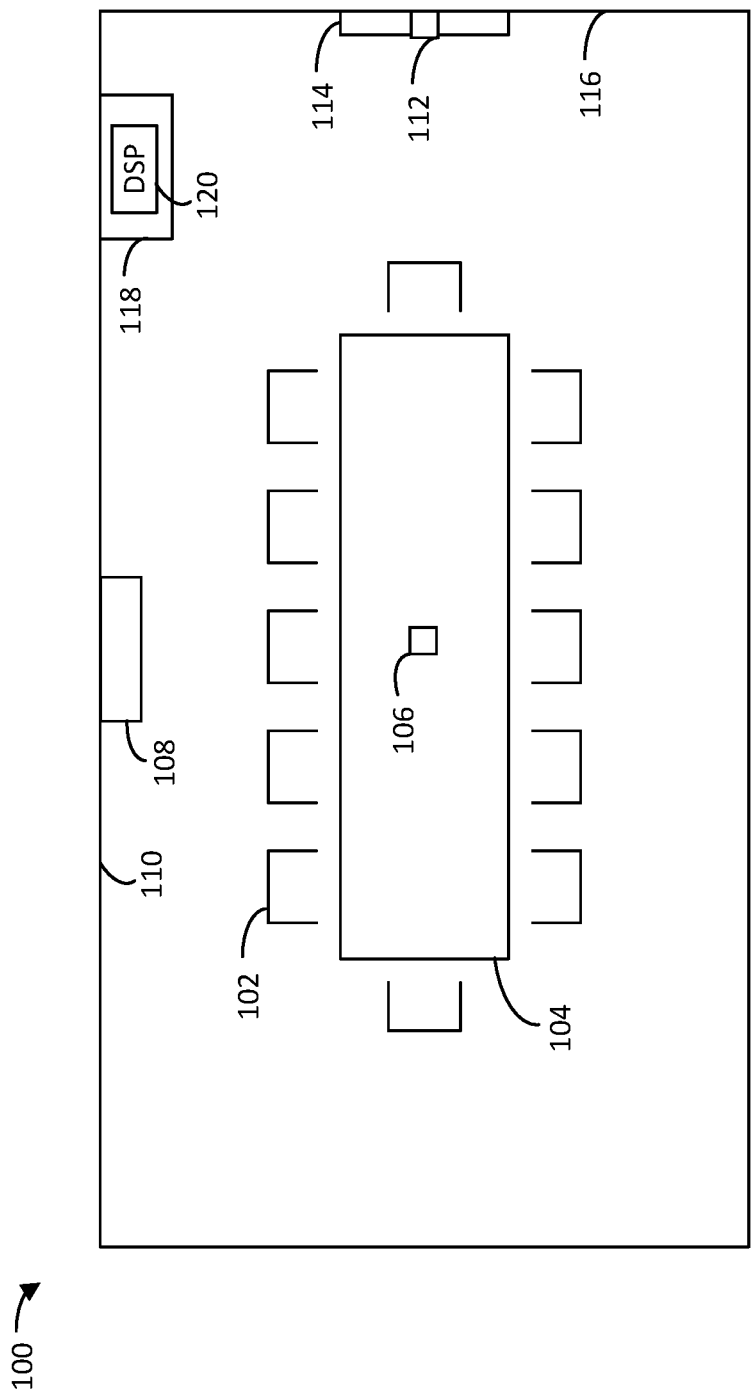
FIG. 1 is a block diagram illustrating an exemplary conferencing environment in accordance with one or more embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Systems and methods are provided herein for automatically configuring and tuning one or more settings of a digital signal processor included in an audio system used to facilitate a conferencing operation (such as, e.g., a conference call, telecast, webcast, etc.) or other audio/visual event. The audio system may be configured as an eco-system comprised of at least one speaker, one or more microphones, a digital signal processor, and a controller that is in communication with each of the other devices using a common communication protocol. In various embodiments, the controller is configured to perform a plurality of automated, or semi-automated, operations related to setup, testing, configuration, and tuning or optimization of the audio system. For example, said operations may include: (1) a device discovery aspect for identifying the number and type of devices located in a given room; (2) a routing aspect for establishing or identifying audio routes (or audio signal path) between the devices; (3) a signal continuity aspect for checking or confirming that the devices are properly connected to the system (e.g., cables connected, test signals reaching intended destinations, etc.), have appropriate mute and gain settings (e.g., not muted), and AEC references are properly selected; (4) a measurement aspect for performing certain acoustic measurements of the audio system based on audio captured by microphones in response to a test signal played over speakers; (5) an analysis aspect for analyzing the audio captured during the measurement aspect in order to calculate a distance between certain components of the audio system, determine variations caused by the acoustics of the room or environment, deduce frequency response and echo characteristics, and make other observations related to a noise level of the room; (6) an optimization aspect for prescribing and establishing optimal configurations for the DSP component based on the outcomes of the analysis aspect; (7) a verification aspect for evaluating the performance of the audio system upon undergoing the optimizations; (8) a refinement aspect for repeating one or more of the above aspects, as needed, based on the outcome of the verification aspect; and (9) an output aspect for indicating success or failure of the test operations to a user or installer of the audio system. In embodiments, the optimization aspect can include automatically tuning the DSP to compensate for variations in gain levels across different talkers, set equalizations for frequency shaping (e.g., low frequency management), select default lobe positions and beamwidths based on room characteristics, and achieve desired noise reduction levels and acoustic echo cancellation.

FIG. 1 illustrates an exemplary conferencing environment 100 in which one or more techniques for automatically configuring and tuning digital signal processing (DSP) settings, and other automatic testing and optimization techniques, may be used, in accordance with embodiments. The conferencing environment 100 may be a conference room, a boardroom, or any other meeting room or space where the audio source includes one or more human speakers or talkers participating in a conference call, telecast, webcast, or other meeting or event. Other sounds may be present in the environment 100 which may be undesirable, such as noise from ventilation, other persons, audio/visual equipment, electronic devices, etc. In a typical situation, the audio sources may be seated in chairs 102 at a table 104, although other configurations and placements of the audio sources are contemplated and possible, including, for example, audio sources that move about the room.

The conferencing environment 100 includes one or more microphones 106 for detecting and capturing sound from the audio sources, such as, for example, speech spoken by the human speakers situated in the conferencing environment 100 (e.g., near-end conference participants seated around the table 104), music generated by the human speakers, and other near-end sounds associated with the conferencing event. The one or more microphones 106 may be placed on the table 104, as shown, attached to a wall or ceiling, or placed on one or more other surfaces within the environment 100, such as, for example, a lectern, a desk or other table top, and the like. The microphones 106 may be any type of microphone or audio input device capable of capturing speech and other sounds, including, but not limited to, SHURE MXA310, MX690, MXA910, and the like. For example, one or more of the microphones 106 may be a standalone networked audio device, a native microphone built-in to a computer, laptop, tablet, mobile device, or other computing device included in the environment 100 (e.g., computing device 118), or a microphone coupled to the computing device via a Universal Serial Bus ("USB") port, an HDMI port, a 3.5 mm jack, a lightning port, or other audio port.

The conferencing environment 100 also includes one or more loudspeakers 108 for playing or broadcasting far-end audio signals received from audio sources that are not present in the conferencing environment 100 (e.g., remote conference participants connected to the conferencing event through third-party conferencing software) and other far-end audio signals associated with the conferencing event. The one or more loudspeakers 108 may be attached to a wall 110, as shown, attached to the ceiling, or placed on one or more other surfaces within the environment 100, such as, for example, the table 104, a desk or other table top, and the like. The loudspeakers 108 may be any type of speaker or audio output device. For example, one or more of the loudspeakers 108 may be a standalone networked audio device, a native speaker built-in to a computing device included in the environment 100 (e.g., computing device 118), or a speaker coupled to the computing device via a Universal Serial Bus ("USB") port, an HDMI port, a 3.5 mm jack, a lightning port, or other audio port.

As shown, the conferencing environment 100 may also include a camera 112 for capturing video or other images of the conference participants. In some cases, the camera 112 may be configured to detect a position of a given conference participant with the conferencing environment 100 in order to steer a lobe of the microphone 106 towards that participant. The camera 112 may be attached to one of the walls, such as, e.g., wall 116, as shown, attached to the ceiling, or placed on one or more other surfaces within the environment 100, such as, for example, the table 104, a lectern, a desk or other table top, and the like. The camera 112 may be any suitable type of camera including, for example, a video camera, a still camera, etc.

The conferencing environment 100 may also include a display screen 114 for displaying video or other images associated with the conferencing event, such as, for example, a live video feed of the remote conference participants, a document being presented or shared by one of the participants, a video or film being played as part of the event, etc. The display screen 114 may be attached to one of the walls, such as, e.g., wall 116, as shown, attached to the ceiling, or placed on one or more other surfaces within the environment 100, such as, for example, the table 104, a lectern, a desk or other table top, and the like. The display screen 114 may be any suitable type of display device or unit, including, for example, a computer monitor, a television, etc.

Though not shown, in various embodiments, one or more components of the environment 100 may be combined into one device. For example, in some embodiments, at least one of the microphones 106 and at least one of the speakers 108 may be included in a single device, such as, e.g., a conferencing device or other audio hardware. In other exemplary embodiments, at least one of the speakers 108 and/or at least one of the microphones 106 may be included in the display screen 114. Such combined devices can be placed in any suitable location of the conferencing environment 100, such as on the table 104, a lectern, a desk or other table top, the ceiling, or a wall. Also, it should be appreciated that the conferencing environment 100 may include other devices not shown in FIG. 1, such as, for example, a whiteboard and one or more sensors (e.g., motion sensor, infrared sensor, etc.).

Figure 2:
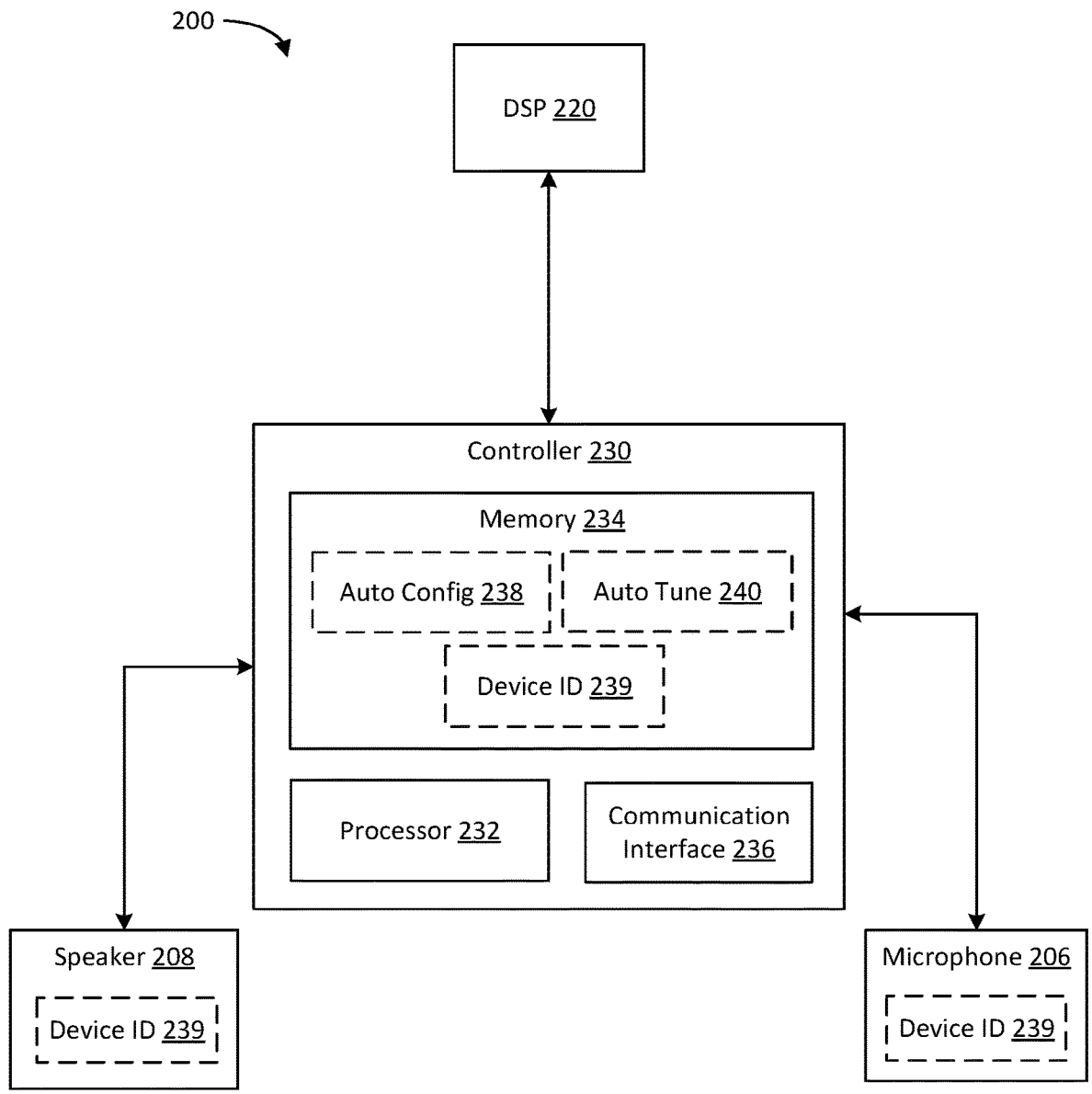
FIG. 2 is a block diagram illustrating an exemplary audio system of the conferencing environment of FIG. 1 in accordance with one or more embodiments.

As illustrated in FIG. 1, the conferencing environment 100 may further include a computing device 118 for enabling a conferencing call or otherwise implementing one or more aspects of the conferencing event. The computing device 118 may be, for example, a personal computer (PC), a laptop computer, a tablet, a smartphone or other smart device, other mobile device, thin client, or other computing platform. In some embodiments, the computing device 118 can be physically located in and/or dedicated to the conferencing environment (or room), as in FIG. 1. In other embodiments, the computing device 118 can be part of a network or distributed in a cloud-based environment. In some embodiments, the computing device 118 resides in an external network, such as a cloud computing network. In some embodiments, the computing device 118 may be implemented with firmware or completely software-based as part of a network, which may be accessed or otherwise communicated with via another device, including other computing devices, such as, e.g., desktops, laptops, mobile devices, tablets, smart devices, etc. In the illustrated embodiment, the computing device 118 can be any generic computing device comprising a processor and a memory device, for example, as shown in FIG. 2. The computing device 118 (also referred to herein as a "processing device") may also include other components commonly found in a PC or laptop computer, such as, e.g., a data storage device, a native or built-in audio microphone device and a native audio speaker device.

According to embodiments, the microphone(s) 106, speaker(s) 108, and other components of the conferencing environment 100 can be connected or coupled to the computing device 118 via a wired connection (e.g., Ethernet cable, USB cable, etc.) or a wireless network connection (e.g., WiFi, Bluetooth, Near Field Communication ("NFC"), RFID, infrared, etc.). For example, in some embodiments, one or more of the microphone(s) 106 and speaker(s) 108 may be network audio devices coupled to the computing device 118 via a network cable (e.g., Ethernet) and configured to handle digital audio signals. In other embodiments, these devices may be analog audio devices or another type of digital audio device.

In embodiments, the computing device 118 includes one or more components configured to facilitate the conferencing event and/or process audio signals associated with the conferencing event to improve an audio quality of the event. In some embodiments, the computing device 118 comprises a digital signal processor ("DSP") 120 configured to process the audio signals received from the various audio sources using, for example, automatic mixing, matrix mixing, delay, compressor, parametric equalizer ("PEQ") functionalities, acoustic echo cancellation, and more. According to embodiments, one or more configurations or settings of the DSP 120 (also referred to herein as a "digital signal processing component") may be automatically selected, tuned, and/or adjusted using techniques described herein, for example, with respect to FIGS. 3 and 4. In other embodiments, the DSP 120 may be a standalone device operatively coupled or connected to the computing device 118 using a wired or wireless connection.

Various components of the DSP 120 may be implemented in hardware (e.g., discrete logic circuits, application specific integrated circuits (ASIC), programmable gate arrays (PGA), field programmable gate arrays (FPGA), etc.), using software (e.g., program modules comprising software instructions executable by a processor), or through a combination of both. For example, some or all components of the DSP 120 may use discrete circuitry devices and/or use a processor (e.g., audio processor, digital signal processor, or other processor) executing program code stored in a memory, the program code being configured to carry out one or more processes or operations described herein. In embodiments, all or portions of the processes may be performed by one or more processors and/or other processing devices (e.g., analog to digital converters, encryption chips, etc.) within or external to the computing device 118. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the operations described herein. For example, program code stored in a memory of the computing device 118 may be executed by a processor of the computing device 118, by the digital signal processor 120 itself, or a separate audio processor in order to carry out one or more of the operations shown in FIGS. 3 and 4. In some embodiments, the program code may be a computer program stored on a non-transitory computer readable medium that is executable by a processor of the device.

One exemplary embodiment of the DSP 120, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP 120, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out the audio processing techniques described herein, as will be appreciated.

The computing device 118 may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in a memory of the computing device 118 and/or may be stored on a remote server (e.g., on premises or as part of a cloud computing network) and accessed by the computing device 118 via a network connection. Some software applications may be configured as a distributed cloud-based software with one or more portions of the application residing in the computing device 118 and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

FIG. 2 illustrates an exemplary audio system 200 configured to facilitate a conference call or other audio/visual event and carry out one or more automated set-up and tuning operations described herein, in accordance with embodiments. The audio system 200 (also referred to herein as an "audio conferencing system") may be included in the conferencing environment 100 of FIG. 1. For example, the audio system 200 comprises one or more microphones 206, one or more speakers 208, and a digital signal processor 220, each of which may be the same as, or substantially similar to, the one or more microphones 106, the one or more loudspeakers 108, and the DSP 120, respectively, of FIG. 1.

As shown in FIG. 2, the audio system 200 further comprises a controller 230 communicatively coupled to each of the microphone 206, the speaker 208, and the DSP 220. According to embodiments, these components of the audio system 200 may be in communication with the controller 230 using a wired connection (e.g., Ethernet, USB or other suitable type of cable) or a wireless network connection (e.g., WiFi, Bluetooth, Near Field Communication ("NFC"), RFID, infrared, etc.). In some embodiments, one or more components of the audio system 200 may be embodied in a single hardware device. For example, the controller 230 and the DSP 220 may reside in a single computing device, such as, e.g., computing device 118 of FIG. 1. As another example, the controller 230 and one or more of the speaker 208 and the microphone 206 may constitute a single audio device, such as, e.g., a network audio device or the like, and the digital signal processor 220 may exist as a standalone or separate component, as shown in FIG. 2.

In general, the controller 230 may be configured to control and communicate or interface with the other hardware devices included in the audio system 200, such as the microphones 206, the speakers 208, and other devices on the network. The controller 230 may also control or interface with the software components of the audio system 200. In addition, the controller 230 may be configured to communicate or interface with external components coupled to the audio system 200 (e.g., remotes servers, databases, and other devices). For example, the controller 230 may interface with a component graphical user interface (GUI or CUI) associated with the audio system 200 and any existing or proprietary conferencing software. In addition, the controller 230 may support one or more third-party controllers and in-room control panels (e.g., volume control, mute, etc.) for controlling the microphones 206 and speakers 208. Moreover, the controller 230 may be configured to control and support operation of the DSP 220, including, for example, start and stop the DSP 220, configure one or more parameters of the DSP 220, configure other audio parameters (e.g., which devices to open, what audio parameters to use, etc.), monitor status updates from or related to the DSP 220, and configure the DSP channel count to accord to a relevant license. Further, the controller 230 may manage soundcard settings and internal/external audio routing, system wide configurations (e.g., security, startup, discovery option, software update, etc.), persistent storage, and preset/template usage.

Figure 3:
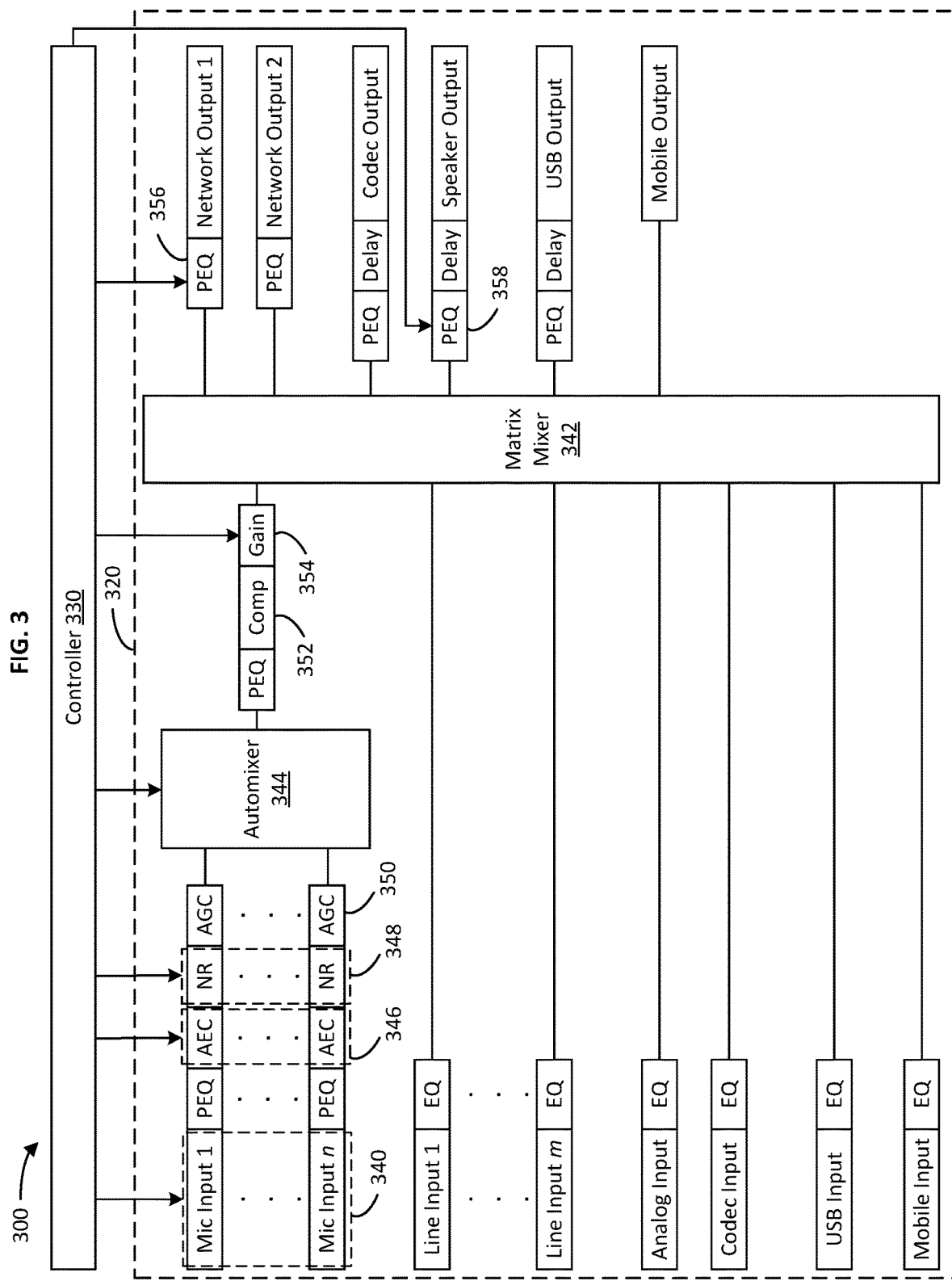
FIG. 3 is a block diagram illustrating an exemplary signal processing system for automatically configuring a digital signal processing (DSP) component, in accordance with embodiments.
Figure 4:
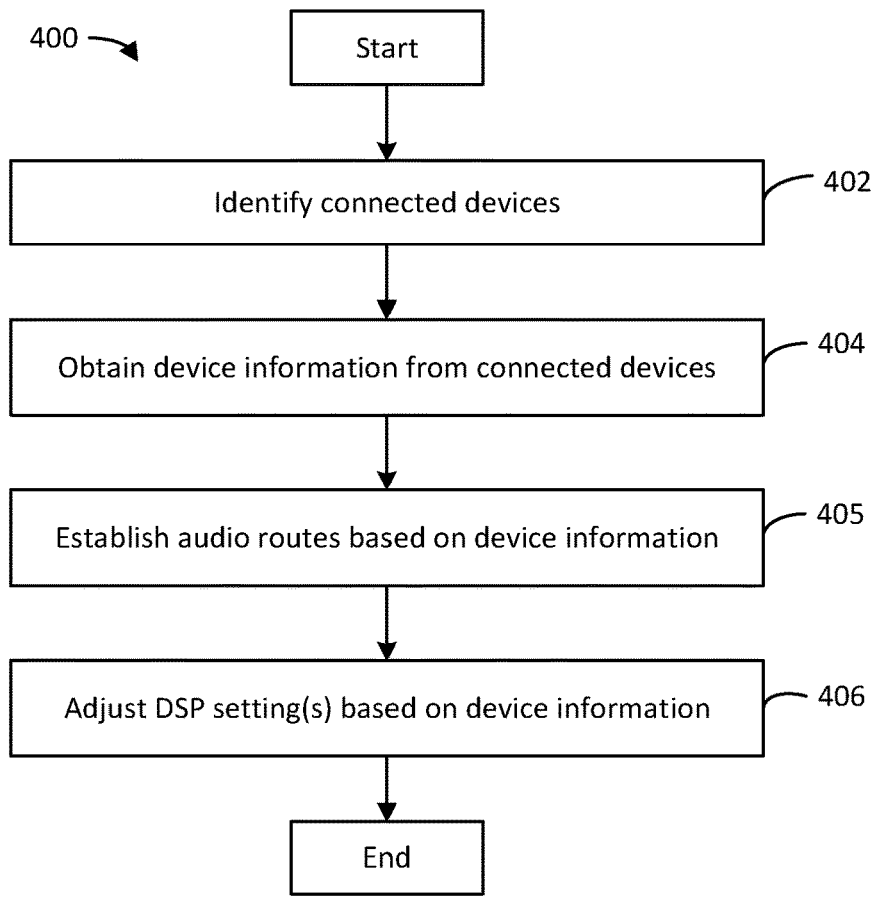
FIG. 4 is a block diagram illustrating an exemplary process for automatically configuring the DSP component of FIG. 3, in accordance with one or more embodiments.
Figure 5:
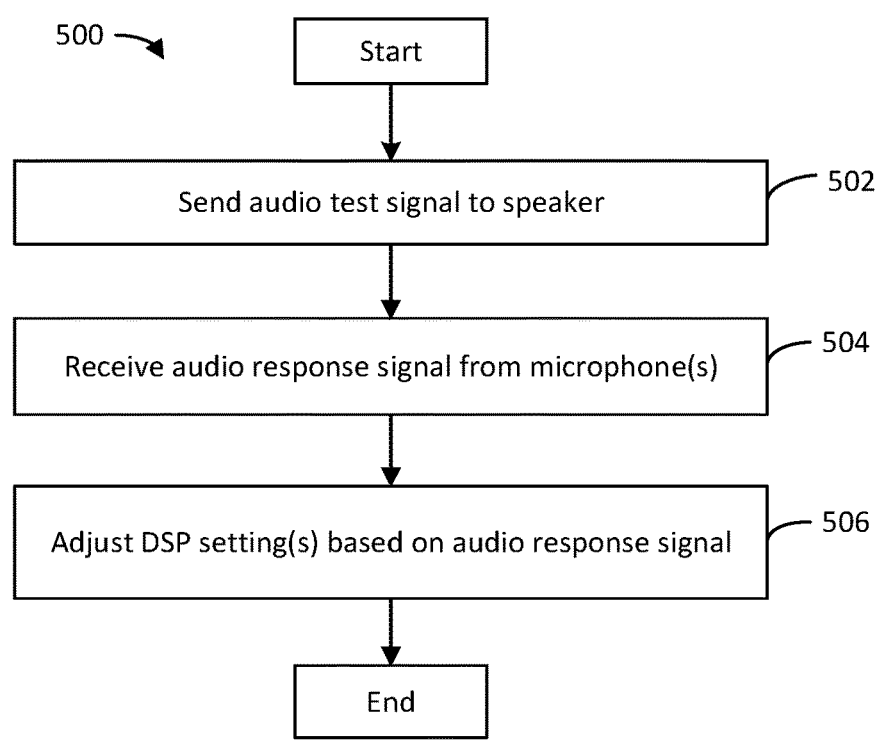
FIG. 5 is a block diagram illustrating an exemplary process for automatically tuning the DSP component of FIG. 3, in accordance with one or more embodiments.

In various embodiments, the controller 230 can be configured to automatically set-up, test, configure, and/or optimize the audio system 200, or more specifically, each component of the audio system 200, for example, in accordance with process 400 of FIG. 4, process 500 of FIG. 5, and/or the operations shown in FIG. 3. As shown in FIG. 2, the controller 230 may comprise a processor 232, a memory 234, and a communication interface 236. These components may be communicatively coupled by system bus, network, or other connection mechanism (not shown). In some embodiments, the controller 230 is a standalone computing device, such as, e.g., the computing device 118 shown in FIG. 1, or other control device that is separate from the speaker 208 and the microphone 206. In other embodiments, the controller 230 resides in another component of the audio system 200, such as, e.g., an audio device that also includes at least one of the speaker 208 and the microphone 206. In such cases, the given component may be assigned controller status (e.g., after the audio system 200 carries out a controller selection process during a device discovery operation of the system 200, as described herein), and processor 232, memory 234, and communication interface 236 may represent the existing processor, memory, and communication interface, respectively, of that component.

Processor 232 may include a general purpose processor (e.g., a microprocessor) and/or a special purpose processor (e.g., an audio processor, a digital signal processor, etc.). Processor 232 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Memory 234 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, memory 234 includes multiple kinds of memory, particularly volatile memory and non-volatile memory.

Memory 234 may be computer readable media on which one or more sets of instructions, such as the software for operating the methods of the present disclosure can be embedded. The instructions may embody one or more of the methods or logic as described herein. As an example, the instructions can reside completely, or at least partially, within any one or more of the memory 234, the computer readable medium, and/or within the processor 232 during execution of the instructions. In embodiments, memory 234 stores one or more software programs (not shown) for implementing or operating all or parts of the techniques described herein, the audio system 200, the controller 230, the digital signal processor 220, and/or methods, processes, or operations associated therewith, including, for example, process 400 shown in FIG. 4, process 500 shown in FIG. 5, and the operations shown in FIG. 3.

In some embodiments, memory 234 may include one or more data storage devices configured for implementation of a persistent storage for data that needs to be stored and recalled by the end user, such as, e.g., presets, log files, user-facing events, configurations for audio interfaces, current status information, user credentials, etc. In such cases, the data storage device(s) may save data in flash memory or other memory devices. In some embodiments, the data storage device(s) can be implemented using, for example, SQLite data base, UnQLite, Berkeley DB, BangDB, or the like.

Communication interface 236 may be configured to allow the controller 230 to communicate with one or more devices (or systems) according to one or more protocols. In one example, the communication interface 236 may be a wired interface, such as an Ethernet interface or a high-definition serial-digital-interface (HD-SDI). As another example, the communication interface 236 may be a wireless interface, such as a cellular, Bluetooth, or Wi-Fi interface. In some examples, communication interface 236 may enable the controller 230 to transmit information to and receive information from one or more of the microphone 206 and speaker 208, or other component(s) of the audio system 200. This can include device identifiers, device operation information, lobe or pick-up pattern information, position information, orientation information, commands to adjust one or more characteristics of the microphone or speaker, and more.

In embodiments, in order to enable said information exchange and other communications, each of the other components or devices of the audio system 200 (e.g., the microphone 206 and/or the speaker 208) may also include a communication interface similar to, or compatible with, the communication interface 236. In this manner, the components of the audio system 200 can be configured to form a network in which a common communication protocol (or "language") is used for intra-network communication, including, for example, sending, receiving, and interpreting messages. The common communication protocol can be configured to support direct one-to-one communications between the controller 230 and each of the devices or components of the audio system 200 (e.g., the microphone 206 and/or the speaker 208) by providing a specific application programming interface ("API") to each device. The API may be specific to the device and/or to the function or type of information being gathered from the device via the API.

In embodiments, the audio system 200 can be configured to perform an automatic configuration operation for configuring or setting up the DSP 220, the one or more microphones 206, the one or more speakers 208, and/or any other component of the audio system 200 based on recommended device configuration settings and, in some cases, position information and other measurement data associated with the conferencing environment 100. As shown in FIG. 2, the controller 230 may include an automatic configuration component or software module 238 (also referred to herein as an "autoconfiguration component") stored in memory 234 and configured to cause the controller 230 to interact with the DSP 220, the microphone 206, the speaker 208, and/or any other component of the audio system 200 in order to carry out one or more of these operations.

As also shown, the controller 230 may further include an automatic tuning component or software module 240 (also referred to herein as an "autotuning component") configured to perform an automatic tuning operation for further configuring or refining one or more of the DSP configurations established by the autoconfiguration component 238 for the DSP 220, or any other setting established for the one or more microphones 206, the one or more speakers 208, and/or any other component of the audio system 200. In embodiments, the autotuning component 240 can be configured to refine these settings or configurations based on (a) data collected in association with, or as a result of, a test signal played by the speaker(s) 208 and captured by the microphone(s) 206 (e.g.,
a distance between the speaker and the microphone, acoustic measurements of the environment or room, a noise level of the room, etc.), and/or (b) noise observations of the conferencing environment 100 that are collected over a longer period of time to be applied in an adaptive manner.

In some embodiments, the autotuning component 240 may be a separate module that is stored in the memory 234, as shown in FIG. 2, and configured to cause the controller 230 to interact with the DSP 220, the microphone 206, the speaker 208, and/or any other component of the audio system 200. In such cases, the autotuning component 240 may be in communication with the autoconfiguration component 238 in order to exchange data and/or other information pertaining to the various settings of the DSP 220 and/or other components of the system 200. In other embodiments, the autotuning component 240 may be a sub-component of (or included within) the autoconfiguration component 238. In such cases, the autotuning component 240 may be controlled by the autoconfiguration component 238 and, in some cases, may perform one or more of the operations assigned to the autoconfiguration component 238.

According to embodiments, the automatic configuration component 238 can be configured to perform a device discovery operation at initial set-up that comprises detecting or identifying each microphone 206, speaker 208, and any other device connected to the audio system 200 by obtaining a device identifier ("ID") from each device, or other information for identifying the device. The device discovery operation further comprises establishing a common communication protocol with each identified device using the corresponding device identifier, the communication protocol being compatible with the communication interface 236, as described herein. In addition, the automatic configuration component 238 can be configured to perform an automatic configuration operation that comprises configuring each detected device based on device capabilities and other device information retrieved from the device during the device discovery operation.

As an example, each device in the audio system 200 may have a pre-assigned unique identifier (ID) 239, such as a serial number, device address, IP address, or other unique device ID. As shown in FIG. 2, the device ID 239 may be stored on the device, for example, in a memory or other electronically readable storage location of the device. As part of the device discovery process, the controller 230 can be configured to retrieve or collect device IDs 239 from each device included in the audio system 200 using an appropriate ID collection technique, such as, but not limited to, a roll call process (e.g., requesting each device to send its device ID in response to a "roll call"), a periodic pinging process (e.g., each device periodically advertises its presence on the network by sending out its device ID), and more. The controller 230 may utilize the communication interface 236 to perform the collection of device IDs 239. Once the device ID 239 is obtained from a detected or discovered device, the controller 230 can be configured to use the device ID 239 to establish a direct one-to-one communications between the controller 230 and the corresponding device using the common communications protocol. For example, a communication from the controller 230 may include a specific device ID 239 in order to identify or distinguish which device is being addressed in the communication.

In embodiments, the controller 230 may send out such communications to gather device capabilities and other device information from each device in the audio system 200. The device information obtained from the discovered devices may include, but is not limited to, serial number, network address, firmware version, model number, number of audio input ports, number of audio output ports and signal processing blocks present, or any other type of information. Based on the gathered information, the controller 230 can identify a general category of the device (e.g., speaker or microphone) and an exact device type or classification (e.g., SHURE MXA910, MXA710, MXN5-C, etc.). In some embodiments, the identified device type may be associated with, or correspond to, one or more preset, or pre-selected, parameters for configuring select DSP settings. These parameters may be stored in memory 234 of the controller 230 (e.g., as a look-up table) or other memory included in or connected to the audio system 200 (e.g., a remote server or database).

In some embodiments, the controller 230 uses the above techniques to communicate with each device one by one, obtain device information in return, and based on the received information, generate an estimated representation or "model" of all the devices that make up the audio system 200, or otherwise become aware of them. The device information may include number of inputs, number of outputs, supported features, list of parameters for various settings (e.g., gain, frequency, level, Q, bandwidth, etc.), and other relevant information. Initially, the model may only include the discovered devices (also referred to as "nodes"). The model may also include interconnections between the discovered devices. In embodiments, the interconnections (also referred to as "edges") may be determined or identified by the controller 230. For example, the controller 230 may determine or prescribe the appropriate interconnections for connecting select discovered devices based on additional device information gathered during the audio routing analysis, such as, for example, the capabilities of each discovered device, and/or information deduced from said capabilities (e.g., optimal setup configuration, etc.). In such cases, the controller 230 may direct or cause the devices to make or create the determined interconnections between themselves. As another example, if the interconnections are pre-existing, the controller 230 may discover or identify the interconnections through a query process using the established communication protocol. In either case, the controller 230 may add the interconnections to the nodes in the model to complete the overview, and may use the completed model for automated setup and testing purposes. The model may be stored in, for example, memory 234 or other storage location of the audio system 200 (e.g., a remote server or database).

In some embodiments, upon receiving the device ID 239 for a given device, the controller 230 can be configured to retrieve the preset DSP parameters associated with the device ID 239 from memory 234 or other storage location, and provide the retrieved parameters to the DSP 220 for configuring corresponding DSP settings based thereon. In some embodiments, certain DSP settings can be determined or set based on device information indicating the DSP channel to which the device is connected (e.g., as shown in FIG. 3). The preset DSP parameters can include selections or default values for specific parameters, such as, e.g., parametric equalization, noise reduction, compressor, gain, and/ or other DSP components shown in FIG. 3, for example. Depending on the type of DSP setting, the preset parameter may be applied prior to, or after, an automixing operation for combining multiple microphone signals (e.g., as shown in FIG. 3).

In some embodiments, the autoconfiguration component 238 can be further configured to perform a controller selection operation during initial set-up of the audio system 200. For example, the device capabilities information obtained during device discovery may indicate whether the device is a controller, or possesses the capability to be a controller. In some cases, only one of the devices may be capable of being a controller, or may be pre-designated as the controller (e.g., computing device 118 in FIG. 1). In other cases, two or more devices may have controller capabilities. In such cases, the autoconfiguration component 238 may assign controller status to one of said devices either randomly or based on certain factors, such as firmware (e.g., whichever device has the most recent or latest firmware), capabilities (e.g., whichever device has the most capabilities), or any other factor that may be determined from the model number of the device, for example, or any other available device information. In cases where the devices are otherwise identical, the autoconfiguration component 238 may assign the controller status using other suitable means, such as, for example, ordering the devices by unique identifier, network address, or other parameter and selecting the device that comes first (e.g., numerically or alphanumerically). Once a device is established as the controller 230, it has the authority or responsibility to preside over the remaining stages of the auto set-up operation, as well as the automatic configuration process. For example, the assigned controller 230 can be configured to use the autoconfiguration component 238 to begin the device discovery process for the rest of the devices in the audio system 200.

According to embodiments, the autoconfiguration component 238, the autotuning component 240, and/or another component of the controller 230 can be configured to perform other operations related to setting up the audio system 200, such as, but not limited to, establishing audio routes between the various audio devices (e.g., speakers and microphones), and checking signal continuity along those audio routes by confirming that the audio devices are properly connected to the system 200. In some embodiments, the autoconfiguration component 238 may perform the audio routing operation, while the autotuning component 240 may perform the signal continuity operation In other embodiments, the autoconfiguration component 238 may perform both operations.

The audio routes may be established through audio subscriptions, or by assigning each audio input channel of a given device to a select audio source channel. The audio sources may be the outputs of other devices in the system 200, or any other audio sources present in the network. For example, the audio subscriptions may include setting input channel #3 of speaker A to be sourced from output channel #2 of the computing device, setting input channel #1 of speaker A to be sourced from output channel #3 of microphone B, etc.

The signal continuity check may include sending a test signal to the one or more speakers 208 for playback and checking whether the signal is captured by each of the microphones 206. For example, the test signal may include one or more audio signals comprised of specific frequency tones and configured to have a predefined spectral shape (e.g., pink noise, white noise, sine waves of fixed or swept frequencies, or other stimulus signals). The predefined audio signals may be played over the speaker 208 for a short duration (e.g., 1-2 seconds) at a low audio level, such as, e.g., −75 dBSPL or other audio level that provides good signal measurement by the microphones in the room. One or more of the microphones 206 may capture sound associated with the test signal and generate an audio response signal representative of the test signal. In such embodiments, the audio system 200 and/or the controller 230 can include a signal generator and analyzer configured to generate the audio signal and analyze the resulting audio response.

The test signal can also be used as a reference point for comparison against the captured audio signals to learn more about the audio system 200 and/or the conferencing environment 100. For example, in embodiments, the autotuning component 240 can be configured to perform this comparison and other analysis of the captured audio signals (also referred to herein as an "audio response signal") and use the results to automatically optimize or tune one or more settings of the DSP 220 accordingly, for example, to compensate for frequency resonance, unwanted gains, noise, and/or acoustic echo, and other concerns, as described herein. In such embodiments, the autotuning component 240 can be configured to analyze the captured audio by comparing the input signals to the original test signal and perform acoustic measurements for the conferencing environment 100 based on said analysis. The acoustic measurements may include determining a location of the speakers 208 in the room and calculating a distance between the speaker 208 and each microphone 206, for example. The autotuning component 240 can also be configured to determine or identify variations in the captured audio signals that are caused by the acoustics of the room or environment 100. In addition, the autotuning component 240 can be configured to use the captured audio to analyze voice or noise characterizations in the room and establish a desired noise reduction value for the room. In some embodiments, the autotuning component 240 may be configured to observe audio signals captured by the microphones 206 over a set period of time, compare the collected data to the known test signal to identify an overall acoustic noise level for the conferencing environment 100, and determine a noise reduction value based on the detected noise level for the room.

In some embodiments, in addition to the data gathered from the captured audio signals, the autotuning component 240 can be configured to optimize or tune one or more DSP settings based further on room or position data obtained for the conferencing environment 100, such as, for example, room dimensions and layout, expected talker locations, detected talker locations, and others. The position data may be determined based on image data collected by the video camera 112, pre-stored room data retrieved from a memory (e.g., memory 234), or input signal data collected over time using the microphones 206 (e.g., to identify talker locations), for example.

Referring now to FIG. 3, shown is an exemplary signal processing system 300 comprising a digital signal processing ("DSP") component 320 and a controller 330 configured to optimize, tune, or otherwise configure one or more settings of the DSP component 320 (also referred to herein as a "digital signal processor" or "DSP"), in accordance with embodiments. Various components of the DSP 320 and/or the controller 330 may be implemented in hardware, software, or a combination of both. In some embodiments, the signal processing system 300 may be included in the audio system 200 and may be part of the same network as the one or more microphones 206 and speaker 208. For example, the DSP component 320 and the controller 330 may be substantially similar to, or the same as, the DSP 220 and controller 230, respectively, of FIG. 2. In addition, the controller 330 may include an automatic configuration component that is the same as, or substantially similar to, the autoconfiguration component 238 shown in FIG. 2 and described herein. The controller 330 may also include an automatic tuning component that is the same as, or substantially similar to, the autotuning component 240 shown in FIG. 2 and described herein. Accordingly, the following paragraphs will describe the signal processing system 300 with reference to the components of the audio system 200 and/or the conferencing environment 100, where relevant.

As shown in FIG. 3, the DSP component 320 can be configured to interface with several different types of audio input devices and audio output devices and can be further configured to produce separate outputs for each audio output device. For example, the audio input devices can include one or more networked microphones (e.g., microphones 206), and the audio output devices can include one or more networked speakers (e.g., speaker 208), each of which is communicatively coupled to the signal processing system 300 via an Ethernet network or the like. As shown in FIG. 3, the DSP component 320 may include a first plurality of audio channels for receiving microphone inputs, i.e. microphone input channels 340, from respective networked microphones and a second plurality of audio channels for transmitting corresponding microphone outputs (e.g., Network Outputs 1 and 2) to each of the networked speakers.

As also illustrated, the DSP component 320 may include a plurality of other audio input channels for receiving other types of audio inputs, such as, but not limited to, line inputs comprising near-end audio captured by other microphones or audio devices coupled to an external audio port of the system 300 (e.g., using a 3.5 mm or HDMI cable), an analog input comprising near-end audio captured by a native microphone built into the underlying device (e.g., computing device 118), a codec input comprising far-end audio received from a conferencing software in communication with the system 300, a USB input comprising far-end audio captured by a computing device coupled to a Universal Serial Bus ("USB") port of the system 300, and a mobile input comprising far-end audio received from a smart phone or other mobile device in communication with the system 300.

Likewise, the DSP component 320 may include a plurality of other audio output channels for transmitting other types of audio outputs, including, but not limited to, a codec output comprising near-end audio for transmission to remote or far-end participants of a conference call (e.g., via the conferencing software), a speaker output comprising far-end audio to be played out loud within the conferencing environment 100 over a native speaker built-into the underlying computing device, a USB output comprising near-end audio to be provided to the computing device coupled to the USB port (e.g., for transmission to remote participants joining the call via the computing device), and a mobile output comprising near-end audio to be provided to the mobile device (e.g., for transmission to remote participants joining the call via the mobile device).

In some embodiments, the input and output channels of the DSP 320 may be scalable, and the controller 330 may be configured to control or configure the number and type of active audio input and output channels at the DSP 320 based on the results of the device discovery operation described herein. For example, based on the number of networked microphones detected during the device discovery operation, the controller 330 may activate or open a corresponding number of the microphone input channels 340 (also referred to herein as "microphone inputs"). Likewise, the controller 330 may activate or open a corresponding number of the network outputs based on the number of networked speakers detected during the device discovery. The other audio inputs and outputs may be configured in a similar manner depending on whether corresponding audio devices were detected during device discovery.

The DSP component 320 further comprises a plurality of components or blocks for processing the incoming audio signals and generating an appropriate mixed audio output signal based thereon. In particular, the DSP component 320 comprises a matrix mixer 342 configured to generate one or more mixed output signals by combining the microphone input signals (i.e. audio signals received at the microphone inputs 340), line input signals, and/or input signals received from any of the other types of audio devices (e.g., analog input, codec input, USB input or mobile input). Each mixed output signal is provided to an appropriate audio output for transmission to near-end or far-end conference participants. Thus, the contents of each mixed output signal may vary depending on the associated audio output. For example, certain microphone inputs 340 and one or more of the network outputs may be coupled to the same conferencing device, or other audio device capable of both capturing near-end audio signals and playing far-end audio signals. In such cases, the matrix mixer 342 can be configured to generate a mixed output signal for a given audio device that excludes or minimizes its own input signals and includes a mix of the input signals received from all other audio devices in the network (e.g., to avoid creating an echo in the room). In some cases, the matrix mixer 342 may generate a unique mixed output signal for each audio device or output channel. In other cases, the matrix mixer 342 may provide the same mixed output signal to two or more audio devices or output channels.

In addition, the DSP component 320 comprises an automixer 344 coupled to each microphone input channel and configured to combine the individual microphone inputs 340 received via said channels into an automixed output signal. As shown, the resulting automixed output signal may be transmitted over an automix channel to the matrix mixer 342 for inclusion in the mixed output signal.

The automix channel and each microphone input channel 340 may include a plurality of audio processing blocks for further processing certain aspects of the corresponding audio signal before the signal reaches the matrix mixer 342, as shown in FIG. 3. For example, each microphone input channel 340 may include an acoustic echo canceller ("AEC") 346 to reduce or eliminate an echo in the input signal and a noise reduction ("NR") module 348 to reduce a noise level in the input signal. Other audio processing blocks provided on one or more of the automix channel and the microphone input channels 340 may include, for example, an decryption/encryption component, a parametric equalizer ("PEQ") component, an automatic gain control ("AGC") module 350, a compressor ("Comp") module 352, and a post-compressor gain component 354. Similarly, one or more audio processing blocks may be provided on the audio output channels coupled between the matrix mixer 342 and the audio outputs of the DSP 320. These audio processing blocks may also include parametric equalization ("PEQ") components, such as, e.g., PEQs 356 and 358 shown in FIG. 3, and in some cases, a delay component for ensuring that the far-end audio is synchronized with the near-end audio.

In embodiments, the controller 330, or the autoconfiguration component included therein, can be configured to prescribe configurations, optimizations, or other adjustments for various aspects or settings of the DSP component 320 upon analyzing data obtained for the conferencing environment 100. Such data may include, for example, device information obtained from one or more networked devices (e.g., speakers 208, microphones 206, etc.); data obtained from analyzing audio signals captured by the networked microphones, including the audio response signals obtained in response to playing a test signal via a speaker in the room; and position or room data obtained for the room or conferencing environment (e.g., environment 100). The adjustments may relate to any configurable setting of the DSP component 320, including, for example, the audio processing blocks shown in FIG. 3 and described herein, as well as others. The controller 330 can be further configured to establish or carry out the adjustments at the DSP 320 by sending appropriate control signals to the corresponding blocks or components of the DSP 320, as shown in FIG. 3. The control signals may include, for example, parameters, values, and other information for configuring the corresponding DSP settings (e.g., EQ frequencies, gains, mutes, etc.).

For example, the controller 330 may configure an input gain setting for each microphone input channel by adjusting an input gain structure of the microphone inputs 340 based on device information retrieved from the corresponding microphone 206 and/or the audio response signal detected by the corresponding microphone 206 in response to the speaker 208 playing a test signal, as described herein. In some cases, the autoconfiguration component of the controller 330 may be further configured to calculate or estimate an expected distance between the given microphone 206 and a select audio source (e.g., talker), and use the expected distance to further adjust the input gain structure for that microphone 206, for example, based on the Inverse Square Law or the like.

As another example, the controller 330 may configure a setting of the NR module 348 for a given microphone input 340 by adjusting a noise reduction level for the corresponding channel based on the audio response signal detected by the corresponding microphone 206. For example, the audio response signal may be analyzed and a signal or voice to noise ratio ("SNR") may be monitored to determine a noise floor of the signal, or the sum of all noise and other unwanted sounds present in the conferencing environment 100 (e.g., thermal noise, atmospheric noise, and other background noises). Based on (or working backwards from) the measured noise floor, and accounting for system gains (e.g., by removing gains encountered along the path), an aggressiveness of the NR module 348 setting for the corresponding microphone input 340 can be set to achieve a desired or target output noise level. For example, if the NR module 348 setting is set too high, overcorrection may occur, resulting in no sound, and if the setting is set too low, too much noise may be present.

The controller 330 may also configure an off-attenuation setting of the automixer 344 by identifying the microphone input channels that are active or enabled but gated-off (e.g., attenuated or muted) and adjusting the off-attenuation setting for each identified channel accordingly. For example, the off-attenuation setting may be set to turn off a given microphone input channel, or set the amount of attenuation to a default value (e.g., −40 dB), if the corresponding microphone 206 is determined to be inactive during the device discovery process. Such configuration may help reduce low frequency buildup resulting from the presence of non-directional lobes in the audio system 200.

As another example, the controller 330 may configure a lobe position setting for a given microphone input 340 by obtaining position data for the conferencing environment 100 and adjusting the lobe position setting based on the position data. In some embodiments, the position data can indicate the most active seating areas in the room, for example, based on localization data obtained from observing microphone inputs over a period of time. In other embodiments, the position data can indicate expected locations for talkers within the environment 100, for example, based on known locations of one or more chairs 102 around the conference table 104. In either case, each microphone lobe can be directed towards one of the identified talker locations. In some embodiments, the position data is visually determined based on image data captured by the video camera 112. For example, the image data may include image or video depicting the conferencing environment 100, and the controller 330 may be configured to analyze the image data and identify or detect a table location, seating locations, a podium or lectern location, etc. based on visual cues in the image data. In such cases, the microphone lobes may be actively placed at locations having known visual cues.

The controller 330 may also configure the AGC module 350 setting to compensate for different gain patterns observed in the conferencing environment 100 based on the audio response signal. For example, after monitoring and analyzing the captured audio signals for a period of time, one or more gain patterns may be detected for the room indicating the presence of near talkers (e.g., talkers located close to a microphone) and/or far talkers (e.g., talkers located further away from the microphone). In such cases, the fixed gains applied by the AGC module 350 may be adjusted accordingly to compensate for these gain patterns and thereby, provide a more dynamic range for the AGC module 350. As another example, long-term observations of the gain patterns may indicate a bias in a positive or negative direction from a nominal value, which may be indicative of front-end gain misconfiguration. In such cases, compensation can be made to the input gains based on this measured bias, with the intent of driving the long term AGC bias toward zero.

The controller 330 may also configure one or more equalization settings for respective audio outputs by adjusting the relevant equalization setting based on the frequency components of the audio response signals obtained at the microphone inputs 340. In some embodiments, this equalization adjustment may be performed in order to remove a low frequency bump that may be present if the speakers 208 are placed in the corners of the room. For example, as shown in FIG. 3, the controller 330 may adjust the PEQ 356 for network output 1 if the corresponding networked audio device/speaker is contributing to the low frequency bump or component. Likewise, the controller 330 may adjust the PEQ 358 for speaker output if the corresponding loudspeaker is contributing to the low frequency bump.

The controller 330 may also configure a setting of the AEC 346 for one or more of the microphone inputs 340 by determining a position of the speaker 208 within the conferencing environment 100 based on the audio response signals received in response to the test signal, and adjusting the AEC 346 settings for those inputs 340 based on the speaker position. For example, the AEC performance of the audio system 200 may be improved by placing an acoustic "null" in the region around the speaker 208, so that the microphone inputs 340 do not pick up audio being played by the speaker 208, thus reducing speaker interference in the incoming audio signals. In embodiments, the controller 330 can determine the speaker position by calculating a distance between the speaker 208 and each microphone 206 based on the audio response signal.

The controller 330 may also configure a setting of the post-compressor gain component 354 for an output of the compressor module 352, both of which are included on the automix channel, as shown in FIG. 3. For example, the setting for gain component 354 may be adjusted to make up or compensate for a low gain level resulting from the compression techniques applied to the automixed output signal.

As yet another example, the controller 330 may be configured to monitor noise levels in the conferencing environment 100, identify one or more patterns in the noise levels, and adaptively configure the DSP component 320 based on the identified patterns.

Thus, the DSP component 320 can be configured to automatically configure, tune, or adjust certain audio processing settings based on received data. While FIG. 3 shows only a specific set of operations, any number of DSP functions may be implemented, including, without limitation, and by way of example, any of the functionality described in the manual for the P300 IntelliMix Audio Conferencing Processor from SHURE and/or the user guide for the IntelliMix Room from SHURE.

FIG. 4 illustrates an exemplary method or process 400 for automatically configuring a digital signal processing (DSP) component of an audio system (also referred to as an "audio conferencing system") comprising a plurality of audio devices, including a speaker and at least one microphone, in accordance with embodiments. All or portions of the process 400 may be performed by one or more processors and/or other processing devices (e.g., analog to digital converters, encryption chips, etc.) within or external to the audio system (e.g., audio system 200 shown in FIG. 2). In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the process 400. For example, the process 400 may be carried out by a controller or control device (e.g., controller 230 of FIG. 2), or more specifically a processor of said controller (e.g., processor 232 of FIG. 2) executing software stored in a memory (e.g., memory 234 of FIG. 2), such as, e.g., the autoconfiguration module 238. In addition, the controller may further carry out the operations of process 400 by interacting or interfacing with one or more other devices that are internal or external to the audio system and communicatively coupled to the controller.

As shown, the process 400 may include, at step 402, identifying one or more audio devices included in a conferencing room or environment (e.g., conferencing environment 100 of FIG. 1), or otherwise connected to a network or "ecosystem" associated with the conferencing environment. The one or more devices may be identified by the controller collecting or obtaining a device identifier ("ID"), or other unique identification information, from each audio device, including the speaker (e.g., speaker 208 of FIG. 2) and the at least one microphone (e.g., microphone 206 of FIG. 2). For example, step 402 may include the controller sending a query for unique identifiers, or device IDs, to the plurality of audio devices (or to the network formed thereby), and in response, receiving a corresponding unique identifier from each of the devices. Upon receiving a given device ID, the controller can identify the corresponding audio device as a "connected device" and can store the associated device ID in a memory (e.g., in a list or table) for future retrieval.

Though not shown, the process 400 may also include assigning a controller status to one of the connected devices identified in step 402. The controller status may be assigned based on known device capabilities, or after completing a controller selection process, as described herein. In some embodiments, the controller assignment step is included in, or performed as part of, step 402, for example, after all connected devices have been identified. In other embodiments, the controller may be assigned in a separate step, for example, after step 402.

At step 404, the controller obtains device information from each of the audio devices identified at step 402. The obtained device information may include one or more capabilities of the corresponding audio device and/or other pertinent information about the audio device, as described herein. In some embodiments, the obtained device information may be associated with, or include information pertaining to, one or more preset parameters for configuring the one or more settings of the DSP component.

In embodiments, the process 400 further includes the controller establishing a communication protocol with each identified audio device using the corresponding device ID, and using the communication protocol to obtain (e.g., retrieve or request) the device capabilities information and other device information from said device. The communication protocol may be configured to enable direct one-to-one communication between the controller and the given device, as described herein. For example, each audio device may store their device information in a memory of the device (along with the device ID), and may transmit the device information to the controller in response to receiving the request for device information. The controller may store the received device information in a memory as well, for example, in association with the previously-stored device IDs.

At step 405, the process 400 also includes establishing audio routes between the identified audio devices based on the device information obtained at step 404. For example, the device information may include or identify one or more input channels and/or output channels for each of the audio devices. Using this information, the controller may prescribe audio routes between respective inputs and outputs of the various devices by issuing "audio subscriptions," or assigning each audio input channel of a given device to a select audio source or output channel included in the audio system, as described herein.

The process 400 further includes, at step 406, adjusting one or more settings of a digital signal processing (DSP) component based on the device information obtained at step 404. For example, the controller may adjust the one or more settings based on preset parameters that are associated with the received device information and designed for configuring the DSP settings. In embodiments, the one or more settings may be any configurable setting of the DSP component (e.g., DSP 320 of FIG. 3), as described herein. In some embodiments, the DSP component comprises a plurality of audio input channels for receiving audio signals captured by the at least one microphone (e.g., microphone inputs 340 of FIG. 3), and the one or more DSP settings include parameters or configurations for one or more of these audio input channels.

For example, the one or more DSP settings may comprise an input gain structure for at least one of the audio input channels. In such cases, adjusting the one or more settings at step 406 comprises adjusting the input gain structure for a given audio input channel based on the device information associated with the corresponding microphone (e.g., the microphone coupled to that channel), as described herein. In some embodiments, the process 400 further comprises determining an expected distance between an audio source and a given microphone, and adjusting the input gain structure for the audio input channel associated with the given microphone based further on the expected distance, as described herein.

As another example, the one or more DSP settings may comprise an off-attenuation setting for at least one of the audio input channels. In such cases, adjusting the one or more settings at step 406 comprises identifying one or more microphones in the audio conferencing system that are active but gated-off, based on the retrieved device information, and adjusting the off-attenuation setting for each identified microphone, as described herein.

In some embodiments, the process 400 also includes obtaining position data for the conferencing environment. In some cases, the position data may be determined based on image data of the environment captured by a video camera included in the audio system. In other cases, the position data may be determined based on known seated locations in the room (e.g., chairs 102 shown in FIG. 1) or detected talker locations derived from analyzing microphone input signals collected over a period of time. In some embodiments, the one or more DSP settings may comprise a lobe position setting for each audio input channel. In such cases, adjusting the one or more settings at step 406 comprises adjusting the lobe position setting based on position data obtained for the conferencing environment, wherein the position data indicates expected locations of one or more conference participants.

In some embodiments, the process 400 may also include generating a model or representation of the conferencing network, or the environment in which the audio system is located, based on the device information collected at step 404. For example, the model may include an identification of each device in the audio system and the interconnections formed between those devices, as well as the types of devices, the number of devices, the number of audio and output channels, etc.

FIG. 5 illustrates an exemplary method or process 500 for automatically tuning or optimizing a digital signal processing (DSP) component of an audio system (also referred to as an "audio conferencing system") comprising a plurality of audio devices, including a speaker and at least one microphone, in accordance with embodiments. All or portions of the process 500 may be performed by one or more processors and/or other processing devices (e.g., analog to digital converters, encryption chips, etc.) within or external to the audio system (e.g., audio system 200 shown in FIG. 2). In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the process 500. For example, the process 500 may be carried out by a controller or control device (e.g., controller 230 of FIG. 2), or more specifically a processor of said controller (e.g., processor 232 of FIG. 2) executing software stored in a memory (e.g., memory 234 of FIG. 2), such as, e.g., the autotuning module 240 and/or the autoconfiguration module 238. In addition, the controller may further carry out the operations of process 500 by interacting or interfacing with one or more other devices that are internal or external to the audio system and communicatively coupled to the controller.

In some embodiments, the process 500 may be performed by the controller after completion of the process 400 shown in FIG. 4, or may be initiated upon completion of the process 400. For example, the plurality of audio devices may be the audio devices identified at step 402 of the process 400.

Moreover, the process 500 may further tune or refine the same DSP component that is configured at step 406 of the process 400.

As shown in FIG. 5, the process 500 may include, at step 502, sending an audio test signal to the speaker for playback, and step 504 comprises receiving an audio response signal representative of the audio test signal from the at least one microphone. As an example, the test signal may include one or more audio signals having a predefined spectral shape (e.g., pink noise, white noise, etc.), as described herein. The microphone may pick up or capture the test signal being played by the speaker and output an audio response signal based thereon. In some embodiments, steps 502 and 504 may be referred to as, or form part of, a signal continuity check for the audio system, as described herein.

Step 506 comprises adjusting one or more settings of a digital signal processing (DSP) component (e.g., DSP 320 of FIG. 3) based on the audio response signal. In some embodiments, the one or more settings may be any configurable setting of the DSP component (e.g., DSP 320 of FIG. 3), as described herein. In other embodiments, the one or more settings may be DSP settings that were previously-adjusted by the controller, for example, at step 406 of FIG. 4, and are now being refined or optimized based on further information obtained at step 504. In some embodiments, the DSP component comprises a plurality of audio input channels for receiving audio signals captured by the at least one microphone (e.g., microphone inputs 340 of FIG. 3), and the one or more DSP settings include optimizations for one or more of these audio input channels.

For example, where the one or more DSP settings comprise an input gain structure for at least one of the audio input channel, adjusting the one or more settings at step 506 may comprise adjusting, or further refining, the input gain structure based on the audio response signal. In another example, the one or more DSP settings may comprise a noise reduction setting (e.g., NR module 348 of FIG. 3) for at least one of the audio input channels. In such cases, adjusting the one or more settings at step 506 comprises adjusting the noise reduction setting based on the audio response signal, as described herein. As another example, the one or more DSP settings may comprise an equalization setting for at least one audio output channel of the DSP component (e.g., PEQs 356 and 358 of FIG. 3). In such cases, adjusting the one or more settings at step 506 comprises adjusting the equalization setting based on a low frequency component of the audio response signal, as described herein.

As yet another example, the one or more DSP settings may comprise an acoustic echo cancellation setting for at least one of the audio input channels (e.g., AEC 346 of FIG. 3). In such cases, adjusting the one or more settings at step 506 comprises determining a position of the loudspeaker within the conferencing environment based on the audio response signal; and adjusting the acoustic echo cancellation based on the speaker position. The speaker position may be determined by calculating a distance between the speaker and each microphone based on the audio response signal, for example.

In some embodiments, the one or more DSP settings may comprise a gain setting for an output of a compressor of the DSP component (e.g., makeup gain 354 of FIG. 3). In such cases, the post-compressor gain may be adjusted at step 506 to compensate for a low gain level output by an automixer of the DSP component (e.g., automixer 344 of FIG. 3), as described herein.

In some embodiments, the process 500 may also comprises monitoring noise levels in the conferencing environment over time for adaptive DSP tuning purposes. For example, through such monitoring, one or more patterns in the noise levels may be identified, and the DSP component may be adaptively configuring based on the identified patterns, as described herein.

Thus, the techniques described herein provide systems and methods for automatically configuring a digital signal processing (DSP) component of an audio system by (a) automatically identifying one or more devices included in an audio system and determine one or more characteristics of an environment or room in which the audio system is located, and (b) automatically tuning one or more DSP configurations of the audio system based on said room characteristics and device information obtained from each device.

It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device may be physically remote (e.g., a standalone microphone) and may be communicatively coupled to the computing device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIGS. 3, 4 and/or 5, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:
1. An audio system, comprising:
at least one speaker configured to play an audio test signal;
at least one microphone configured to capture an audio response signal representative of the audio test signal;
a computing device comprising a digital signal processing component having a plurality of audio input channels for receiving audio signals captured by the at least one microphone; and
one or more processors communicatively coupled to the at least one speaker, the at least one microphone, and the computing device, the one or more processors configured to:
send the audio test signal to the at least one speaker;
receive the audio response signal from the at least one microphone;
based on the audio response signal, determine a signal continuity along a corresponding audio signal path between the at least one speaker and the at least one microphone; and
adjust one or more settings of the digital signal processing component based on the audio response signal.

2. The audio system of claim 1, wherein the one or more processors are further configured to: based on the audio response signal, establish at least one audio signal path between the at least one speaker, the at least one microphone, and/or the computing device.

3. The audio system of claim 1, wherein the one or more settings comprise an input gain structure for at least one of the audio input channels, and the one or more processors are configured to adjust the one or more settings by adjusting the input gain structure based on the audio response signal.

4. The audio system of claim 1, wherein the one or more processors are included in an audio device that also includes the at least one speaker and/or the at least one microphone.

5. The audio system of claim 1, wherein the one or more processors are included in a control device separate from the at least one speaker and the at least one microphone.

6. An audio system, comprising:
at least one speaker configured to play an audio test signal;
at least one microphone configured to capture an audio response signal representative of the audio test signal;
a computing device comprising a digital signal processing component having a plurality of audio input channels for receiving audio signals captured by the at least one microphone; and
one or more processors communicatively coupled to the at least one speaker, the at least one microphone, and the computing device, the one or more processors configured to:
send the audio test signal to the at least one speaker;
receive the audio response signal from the at least one microphone; and
adjust one or more settings of the digital signal processing component based on the audio response signal,
wherein the one or more settings comprise a noise reduction setting for at least one of the audio input channels, and the one or more processors are configured to adjust the one or more settings by adjusting the noise reduction setting based on the audio response signal.

7. The audio system of claim 6, wherein the one or more settings further comprise an equalization setting for at least one audio output channel of the digital signal processing component, and the one or more processors are further configured to adjust the one or more settings by adjusting the equalization setting based on a frequency component of the audio response signal.

8. The audio system of claim 6, wherein the one or more settings further comprise an acoustic echo cancellation setting for at least one of the audio input channels, and the one or more processors are further configured to adjust the one or more settings by:
determining a position of the at least one speaker within an environment of the audio system based on the audio response signal, and
adjusting the acoustic echo cancellation setting based on the speaker position.

9. The audio system of claim 6, wherein the one or more settings comprise an input gain structure for at least one of the audio input channels, and the one or more processors are configured to adjust the one or more settings by adjusting the input gain structure based on the audio response signal.

10. The audio system of claim 6, wherein the one or more processors are included in an audio device that also includes the at least one speaker and/or the at least one microphone.

11. The audio system of claim 6, wherein the one or more processors are included in a control device separate from the at least one speaker and the at least one microphone.

12. A computer-implemented method of automatically tuning an audio conferencing system comprising at least one speaker, at least one microphone, and a digital signal processing component, using one or more processors, the method comprising:
sending an audio test signal to the at least one speaker;
receiving an audio response signal captured by the at least one microphone, the audio response signal being representative of the audio test signal;
based on the audio response signal, determining a signal continuity along a corresponding audio signal path between the at least one speaker and the at least one microphone; and
adjusting one or more settings of the digital signal processing component based on the audio response signal,
wherein the digital signal processing component comprises a plurality of audio input channels for receiving audio signals captured by the at least one microphone.

13. The method of claim 12, further comprising: based on the audio response signal, establishing at least one audio signal path between the at least one speaker, the at least one microphone, and/or the computing device.

14. The method of claim 12, wherein the one or more settings comprise an input gain structure for at least one of the audio input channels, and adjusting the one or more settings comprises adjusting the input gain structure based on the audio response signal.

15. A computer-implemented method of automatically tuning an audio conferencing system comprising at least one speaker, at least one microphone, and a digital signal processing component, using one or more processors, the method comprising:
sending an audio test signal to the at least one speaker;
receiving an audio response signal captured by the at least one microphone, the audio response signal being representative of the audio test signal; and adjusting one or more settings of the digital signal processing component based on the audio response signal, wherein the digital signal processing component comprises a plurality of audio input channels for receiving audio signals captured by the at least one microphone, and wherein the one or more settings comprise a noise reduction setting for at least one of the audio input channels, and adjusting the one or more settings comprises adjusting the noise reduction setting based on the audio response signal.

16. The method of claim 15, wherein the one or more settings further comprise an equalization setting for at least one audio output channel of the digital signal processing component, and adjusting the one or more settings further comprises adjusting the equalization setting based on a frequency component of the audio response signal.

17. The method of claim 15, wherein the one or more settings further comprise an acoustic echo cancellation setting for at least one of the audio input channels, and adjusting the one or more settings further comprises:

determining a position of the at least one speaker within an environment of the audio conferencing system based on the audio response signal; and adjusting the acoustic echo cancellation setting based on the speaker position.

18. The method of claim 15, wherein the one or more settings comprise an input gain structure for at least one of the audio input channels, and adjusting the one or more settings comprises adjusting the input gain structure based on the audio response signal.

* * * * *